United States Patent [19]

Wessel et al.

[11] 4,401,081

[45] Aug. 30, 1983

[54] METHOD AND APPARATUS FOR CLOSED-LOOP CONTROL OF THE OPERATING MIXTURE COMPOSITION IN AN INTERNAL COMBUSTION ENGINE

[75] Inventors: Wolf Wessel, Oberriexingen; Rainer Buck, Tamm, both of Fed. Rep. of Germany

[73] Assignee: Robert Bosch GmbH, Stuttgart, Fed. Rep. of Germany

[21] Appl. No.: 195,963

[22] Filed: Oct. 10, 1980

[30] Foreign Application Priority Data

Oct. 16, 1979 [DE] Fed. Rep. of Germany ....... 2941753

[51] Int. Cl.³ ............................................. F02D 33/00
[52] U.S. Cl. .................................. 123/443; 123/489; 123/568; 123/589
[58] Field of Search .............. 123/443, 489, 571, 589, 123/568; 60/276, 285

[56] References Cited

U.S. PATENT DOCUMENTS

| | | | |
|---|---|---|---|
| 3,745,768 | 7/1973 | Zechnall et al. | 60/276 |
| 3,851,632 | 12/1974 | Teshirogi et al. | 123/589 |
| 3,931,813 | 1/1976 | Horie et al. | 123/568 |
| 4,068,637 | 1/1978 | Takamiya | 123/443 |
| 4,125,098 | 11/1978 | Kiyota | 123/443 |
| 4,134,261 | 1/1979 | Iizuka et al. | 60/285 |
| 4,149,502 | 4/1979 | Johnson et al. | 123/489 |
| 4,195,604 | 4/1980 | Taplin | 123/489 |

*Primary Examiner*—Charles J. Myhre
*Assistant Examiner*—Andrew M. Dolinar
*Attorney, Agent, or Firm*—Edwin E. Greigg

[57] ABSTRACT

A method is described for closed-loop control of the composition of the operating mixture coming to be combusted in an internal combustion engine, wherein operating mixtures are formed in the combustion chambers either simultaneously or sequentially, which differ from one another percentagewise by a predetermined amount of the air number $\lambda$. The different exhaust gas compositions resulting from this difference are measured sequentially or simultaneously with the aid of one or two CO sensors and the average operating mixture composition is regulated such that a constant difference is established for the CO content in the exhaust gas. In the use of a quantity of recirculated exhaust gas to influence the operating mixture composition, an optimal composition of the exhaust gases is thereby established.

17 Claims, 7 Drawing Figures

4,401,081

METHOD AND APPARATUS FOR CLOSED-LOOP CONTROL OF THE OPERATING MIXTURE COMPOSITION IN AN INTERNAL COMBUSTION ENGINE

BRIEF DESCRIPTION OF THE INVENTION

The invention relates to a method and apparatus for an internal combustion engine and in which the open-loop control, with the aid of a probe detects the carbon monoxide content of the exhaust gases of a closed-loop control apparatus intended to reduce air pollution by internal combustion engines.

BACKGROUND OF THE INVENTION

The highest temperature attainable by the addition of oxygen, in comparison to the normal temperature of the exhaust gas, is measured with the aid of a thermal sensor. This apparatus has the disadvantage that not only carbon monoxide (CO) but the other still combustible components remaining after combustion, such as unburned hydrocarbons, are also converted at the catalytically active thermal sensor, influencing the resultant heat level. The sensor accordingly indicates only an inexact value for the toxic exhaust component CO. In particular, characteristic points of the CO spectrum cannot then be ascertained and utilized for closed-loop control purposes.

It is also known to control a quantity of recirculated exhaust gas in open-loop fashion in an engine having external mixture formation. In addition to other variables, the fuel-air ratio, for instance, which is ascertainable via the CO content, is taken into consideration.

OBJECT AND SUMMARY OF THE INVENTION

The method and apparatus according to the invention has the advantage that it is possible to establish at all operational points of the engine an optimal CO content or an optimal air number $\lambda$, at which the emission of toxic substances is at a minimum. It is also possible then to take into consideration the effects of wear and of environmental conditions on the mixture composition and on combustion.

The invention will be better understood and further objects and advantages thereof will become more apparent from the ensuing detailed description of two preferred embodiments taken in conjunction with the drawings.

DETAILED DESCRIPTION OF THE PREFERRED EMBODIMENTS

Particularly in auto-igniting engines, the recirculation of exhaust gas is a very effective means of reducing the nitric oxide which is produced in combustion. The formation of nitric oxide with increasing volume can be reduced by means of high exhaust recirculation rates. One limit to the recirculation of exhaust gas, however, is the buildup of smoke in the exhaust, which occurs particularly in auto igniting engines. The air deficiency which is the cause of this smoke buildup is indicated in the exhaust gases by the increasing CO content. A CO concentration in the exhaust gas which is still tolerable in view of an optimal exhaust composition can be established via the air number $\lambda$. The corresponding air number may be designated as $\lambda_{min}$. This $\lambda$, particularly in auto-igniting engines, has widely divergent values at the various operational points, so that it is not possible to ascertain optimal values for the entire operational range of the engine with a simple check of threshold values as provided by the prior art.

The method according to the invention is based on the observation that with an optimal air number $\lambda_{opt}$ of the order of magnitude of $\lambda_{min}$, where the optimal air number, just like $\lambda_{min}$, has various values at the various operational points of the engine, there is an approximately constant variation in the CO content for all the operational points of the rpm-load graph of the engine with a percentagewise variation d$\Lambda$ of the air number $\lambda (\Lambda = \lambda - / \lambda_{opt})$. This can be expressed by the following formula:

$$\left. \frac{dCO}{d\Lambda} \right|_{\Lambda = 1} = \text{constant} = K.$$

In the method according to the invention, this constant increase of all the CO curves is used as a standard for the optimal $\lambda_{opt}$ which is to be established. In this manner, a closed-loop control is realized wherein the differential quotient $dCO/d\Lambda$ is replaced by the corresponding differential quotients $\Delta CO/\Delta\Lambda = K$. The air number $\lambda$ as a variable is varied such that the constant value K is maintained and thus $\lambda = \lambda_{opt}$.

The value K is monitored in that operational mixtures come to be combusted in the engine which differ from one another by a constant $\Delta\Lambda$. The resulting exhaust gas of the mixtures is constantly monitored to determined whether the corresponding constant $\Delta$ CO value has been maintained.

Figure 3:
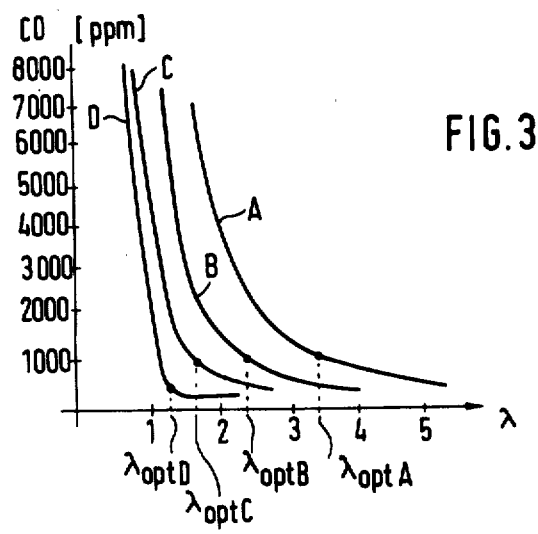
FIG. 3 is a plot-diagram showing CO plotted over the air number $\lambda$.
Figure 4:
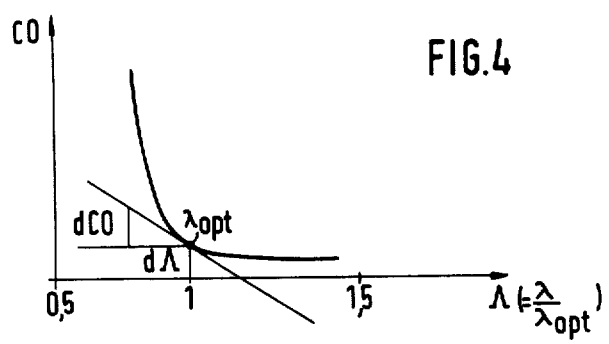
FIG. 4 is a plot-diagram with a CO curve over the air numbers for one operational point of the engine pertaining to the optimal $\lambda$ value.

In FIG. 3, several curves are shown, which indicate the CO content pertaining to the air number $\lambda$ for various load points of the engine at a constant rpm. The letters labelling the curves represent the following: A=2% load, B=25% load, C=50% load, and D=100% load. The curves were obtained from the operation of an auto-igniting engine. It can be seen that with a decreasing air number $\lambda$ the CO content increases sharply and also that the point and the rate of increase in the various load curves differ greatly from one another. In the diagram, optimal $\lambda$ values $\lambda_{opt}$ for the various CO curves are also shown. These values are widely scattered. In a modified representation of the CO curves, with the air number $\lambda$ made to pertain to the air number $\lambda_{opt}$, it is possible for the position of the $\lambda_{opt}$ of all the CO curves to be located at a single point of the abscissa. This point is located at $\Lambda=1$. At this point, however, the inclination of the CO curves is constant, as is shown in FIG. 4. With the aid of two $\Lambda$ values of the operating mixture and of the monitoring measurement of the CO content of the corresponding exhaust gases, the slope $dCO/d\Lambda$ can be ascertained at the present operational point and it can be determined whether this operational point deviates from $\lambda_{opt}$. The average $\lambda$ of the operating mixture is corrected in accordance with any deviation such that the predetermined slope K is maintained.

The creation of two operating mixtures, which is necessary for the control of the value K, the two mixtures differing from one another by a constant percentage of $\lambda$, must be effected either continuously or periodically with the shortest possible intervals between periods, in order to realize rapid closed-loop control. The CO content can be ascertained either sequentially or simultaneously, with the aid of one or two CO probes. The variation of the $\lambda$ can be effected by varying either the fuel quantity or the quantity of air supplied. The air quantity itself can in turn be varied either by throttling or by the replacement of a quantity of air by inert gas, such as recirculated exhaust gas.

Figure 1:
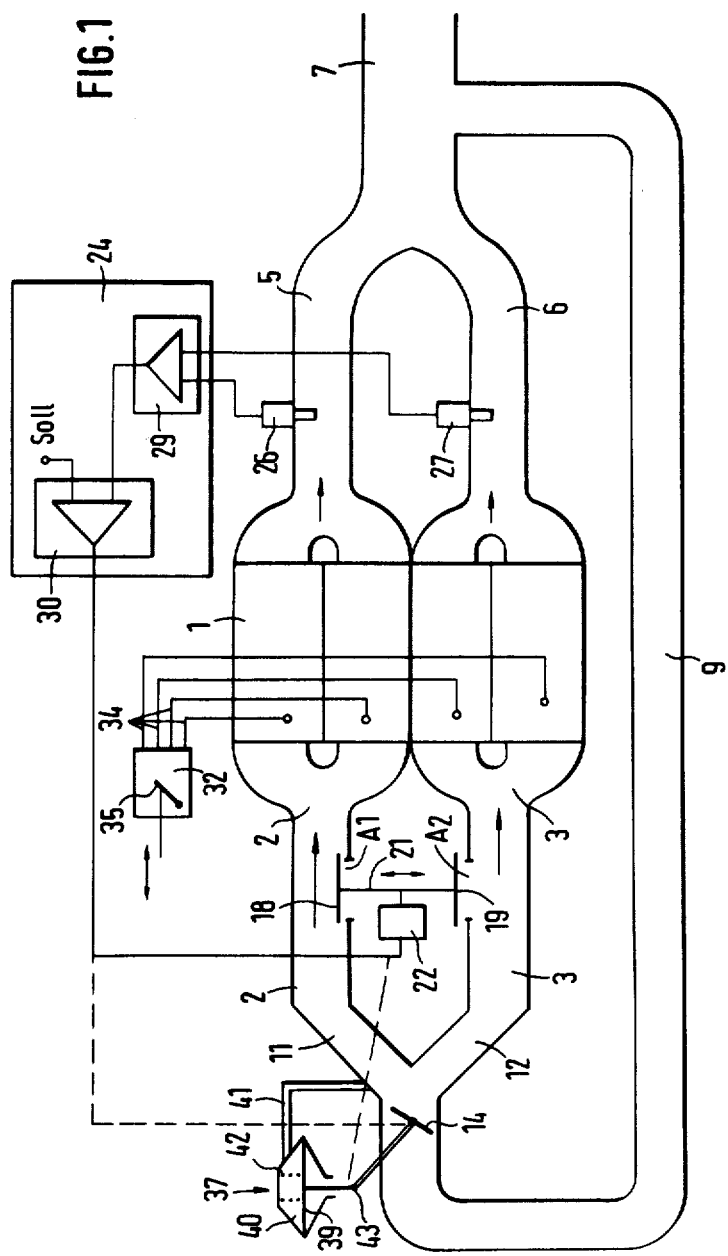
FIG. 1 shows in schematic form a first exemplary embodiment for performing the method according to the invention, having a split intake and exhaust manifold system in which two CO sensors are disposed.

Referring now to the drawings, FIG. 1 shows a first exemplary embodiment for performing the method described. An internal combustion engine 1 is shown schematically, having four cylinders. On the intake side, the engine has a first intake system 2 and a second intake system 3, each supplying two cylinders of the engine. In the same manner, the engine is provided on the exhaust side with a first exhaust manifold system 5 and a second exhaust manifold system 6, which discharge into a common exhaust pipe 7. From the exhaust pipe 7, an exhaust recirculation line 9 leads to the intake side of the engine, with the exhaust recirculation line 9 being divided into a first partial line 11 discharging into the first intake system 2 and a second partial line 12 discharging into the second intake system 3. A throttle valve 14 is disposed in the exhaust recirculation line 9 upstream of the point where the line 9 branches into the first and the second partial lines 11 and 12.

The first intake system 2 also has a first air intake cross section $A_1$ and the second intake system 3 has a second air intake cross section $A_2$. The maximum openings of the first and second air intake cross sections are at a constant ratio to one another of $A_2:A_1=a$. A first throttle body 18 is associated with the first air intake cross section $A_1$ and a second throttle body 19 is associated with the second air intake cross section $A_2$. The two throttle bodies 18 and 19 are connected with one another in such a way that they can simultaneously execute an identical opening stroke. A linkage rod 21 connecting the two throttle bodies is actuated by an adjusting device 22, which is controlled by a closed-loop control device 24. The closed-loop control device 24 receives control signals from a first CO probe 26 disposed in the first exhaust manifold system 5 and from a second CO probe 27 disposed in the second exhaust manifold system 6.

The control device 24 contains a device 29 for the differential formation of the CO values in the first exhaust manifold system 5 and the second exhaust manifold system 6 measured by the CO probes 26 and 27.

The output of the device for differential formation 29 is connected to a comparator device 30, at the second input of which there is a reference signal for the set-point value of the difference $\Delta$ CO from the measured CO values.

In the illustrated example, the internal combustion engine is embodied as an auto-igniting engine and it is supplied with fuel by an injection pump 32 via injection lines 34. The fuel quantity to be injected is varied, that is, the desired torque is established, via a lever 35. The air necessary for combustion of the injected fuel is supplied to the engine via the first air intake cross section $A_1$ and the second air intake cross section $A_2$. The engine aspirates not only the air flowing to it through these cross sections, however, but also a certain quantity of recirculated exhaust gas. The cross section of the air intake cross sections $A_1$ and $A_2$ is varied by the adjustment of the throttle bodies 18 and 19. This adjustment occurs in accordance with the output signal of the closed-loop control device 24. If the aspirated air quantity is insufficient, for instance, then the throttle bodies are displaced in the open direction until such time as the optimal $\lambda_{opt}$ is detected. A quantity of recirculated exhaust gas is supplied to the engine to make up the remaining charge of the cylinders in accordance with the amount of throttling at the intake cross sections.

Because the air intake cross sections differ from one another by the factor a, the cylinder group supplied by the second intake system 3 receives an air quantity which is increased by the factor a. The air number $\lambda$ to be assigned to this cylinder group is accordingly likewise increased by the factor a. Because the factor a is constant for all operational points, the air numbers $\lambda$ of the two cylinder groups differ by a constant value. In the same manner, the pertinent values $\Lambda$ also vary by a constant factor. Because of the structural feature discussed, it is thus always assured that $\Delta\Lambda$ is constant. For the point $\Lambda=1$ or $\lambda=\lambda_{opt}$, a likewise constant $\Delta$ CO is associated with this $\Delta\Lambda$. The corresponding CO contents in the exhaust gas are then measured via the CO probes 26 and 27 and the difference is formed in the device 29. The set-point value supplied in the comparator device represents the increase value, resulting from the quotients $\Delta CO/\Delta\Lambda=K$, at the point of $\Lambda=1$ or at $\lambda_{opt}$.

In this system, which is guided by the fuel quantity, the necessary air quantity for all operational points of the engine is subsequently supplied in an advantageous manner. Because the remaining quantity of the cylinder charges is embodied by recirculated exhaust gas, the maximum recirculated exhaust quantity for reduction of $NO_x$ formation is always obtained. This exhaust gas recirculation has the further advantage that the intake side of the engine is not throttled such as to reduce output, as would be the case in a possible version for carrying out the solution according to the invention if only the aspirated air quantity were controlled in closed-loop fashion by throttling.

With an additional device shown in the embodiment according to FIG. 1, it is furthermore possible to effect a supply of recirculated exhaust gas quantities independent of the counterpressure of the exhaust gas. The pressure established in the intake systems 2 and 3 is held constant with the aid of a pressure regulation valve, made up of the throttle valve 14 and an adjusting memeber 37. In an exemplary realization, this adjusting member 37 comprises a pressure box in which an adjusting diaphragm 39 encloses a work chamber 40 which communicates via a control line 41 with the intake system. The adjusting diaphragm 39, connected via a linkage rod 43 with the throttle valve 14, is under the influence of a control spring 42 and is exposed on its other side to atmospheric pressure.

With this pressure regulation valve, the pressure in both intake systems 2 and 3 is held constant in a simple manner. Naturally it is also possible to provide one pressure regulation valve for each intake system; in that case, intake systems 2 and 3 are prevented from having an influence on each other. It is also possible for the solution shown in FIG. 1 to be so embodied that the quantity of recirculated exhaust gas is controlled in closed-loop fashion and the remaining charge of the cylinders is effected with air up to the attainment of a constant aspiration pressure. In this case, however, $\Delta\Lambda$ is dependent upon the particular operational point at that time.

Figure 2:
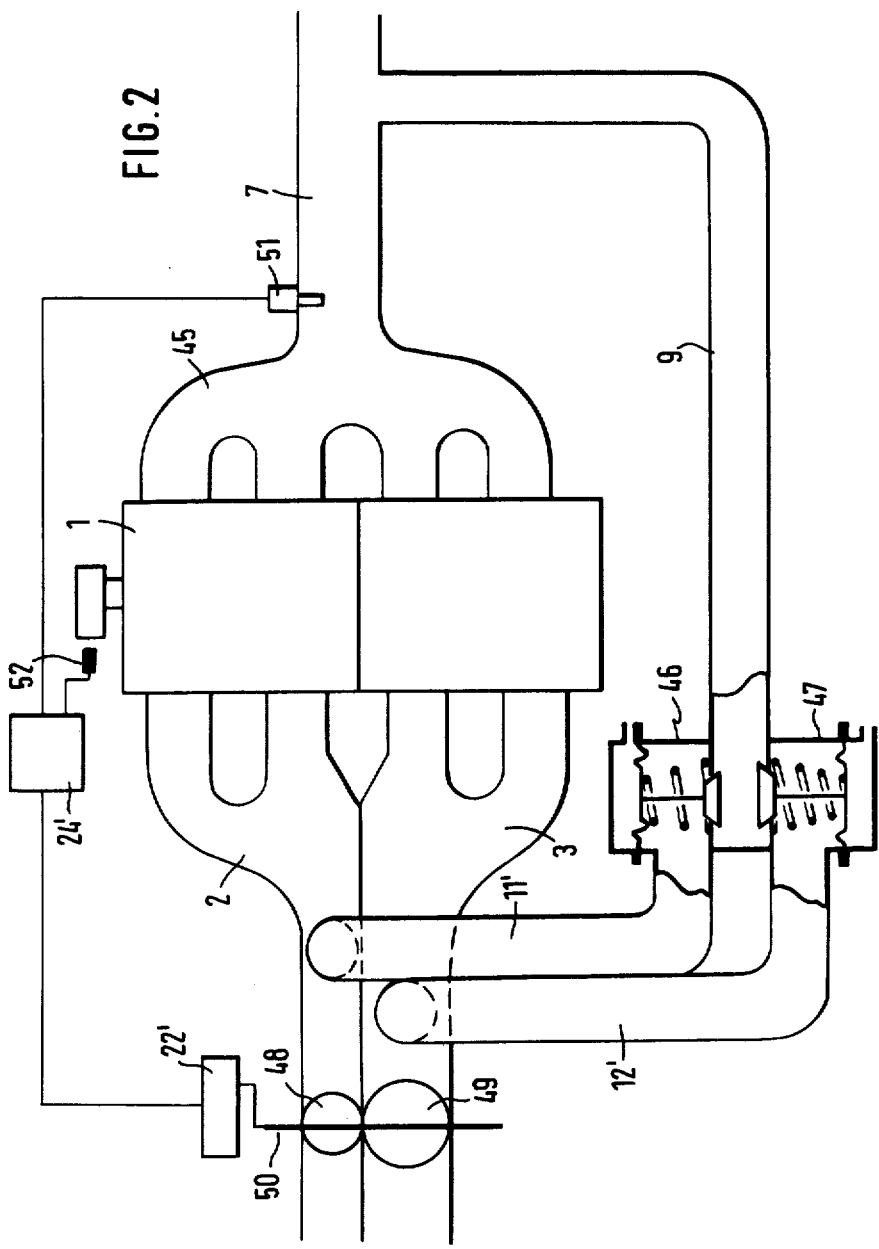
FIG. 2 shows in schematic form a second exemplary embodiment for performing the method according to the invention, having one pressure regulation valve for each of the two intake systems.

The embodiment of FIG. 2 also shows an internal combustion engine 1, which is divided into two cylinder groups, given the example of a four-cylinder engine. Here, as in the foregoing exemplary embodiment, a first intake system 2 and a second intake system 3 are provided. Deviating from the embodiment of FIG. 1, however, the exhaust manifold system 45 is embodied in the conventional fashion, that is, the exhaust gas is delivered to the common exhaust pipe 7 without there being any subdivisions in the system; from there, the exhaust gas is fed back via the exhaust recirculation line 9 to the intake side of the engine. To this end, the exhaust recirculation line 9 branches into a first partial line 11' and a second partial line 12', which have a first pressure regulation valve 46 and a second pressure regulation valve 47 at their junction with the exhaust recirculation line 9, as has already been described in connection with the first embodiment.

A first throttle valve 48 is provided at the entrance of the first intake system 2 and a second throttle valve 49 is provided at the entrance of the second intake system 3. Both throttle valves are disposed in alignment on a common throttle valve shaft 50, which can be actuated via n adjusting device 22'. When the throttle valves are open, the first intake system 2 has an air intake cross section $A_1$ at this point, and the second intake system 3 similarly has a second air intake cross section $A_2$. The partial lines 11' and 12' of the exhaust recirculation line 9 discharge into the first and second intake systems 2 and 3, respectively, downstream of the throttle valves 48 and 49.

Differing from the exemplary embodiment of FIG. 1 but realizable thereon in the same manner, a single CO probe 51 is inserted into the exhaust pipe 7, and its output signal is delivered to a closed-loop control device 24', which controls the adjusting device 22'.

This form of embodiment is possible with CO probes which respond sufficiently rapidly. The intake systems should advantageously be so embodied that the strokes of the cylinders supplied by the first intake system and the strokes of the cylinders supplied by the second intake system occur sequentially, so that the measurement period for measuring the CO content resulting from the different operational mixtures can extend over the period of two strokes. The sequential CO values are stored one after another in a form of slide register; the difference is formed out of the sequential values in analogous fashion to the embodiment of FIG. 1, and the CO is compared with the set-point value. For the measurement cycle, the memory device for the sequential values can be controlled in synchronism with the engine rpm; This is illustrated in the drawing by a cycle or stroke transducer 52 connected with the closed-loop control device 24'.

In the exemplary embodiment of FIG. 1 and 2 described above, the $\Delta\Lambda$ of the operating mixtures was furnished by structural means, which assure that at every operational point of the engine this air number difference is retained. Particularly when a subdivided exhaust manifold system is used, having two CO probes associated with it, it is possible to realize the closed-up control according to the invention even with CO probes which respond relatively slowly. A different structural feature for generating two mixtures which differ from one another by a constant percentagewise air number difference is possible if, for instance, one cylinder is geometrically different, so that the cylinder charge is smaller, for instance by a constant percentage, than the cylinder charge of the remaining cylinders. The desired different operational mixtures are thus obtained with a fuel supply quantity which remains the same. For measurement purposes, however, when the exhaust gas system common to all the cylinders remains unchanged, a very rapidly-responding CO probe is required.

Figure 5:
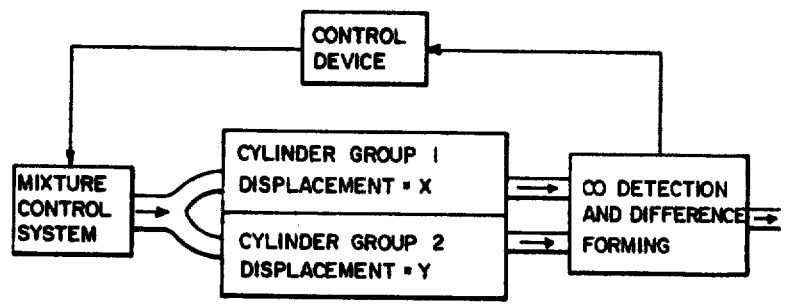
FIG. 5 illustrates a different embodiment including a CO detection and difference-forming means.

FIG. 5 illustrates an engine in which one cylinder X or Y of the two groups of cylinders has a displacement which differs from the remainder of the cylinders for that group of cylinders.

Figure 6:
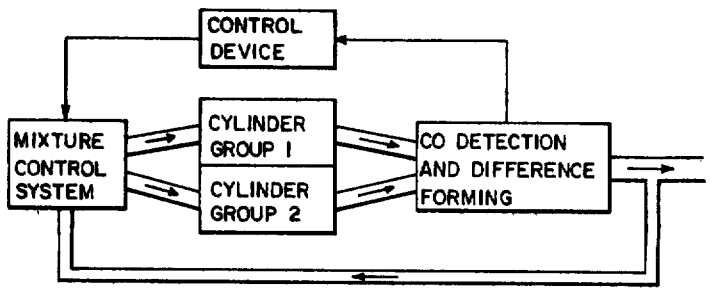
FIG. 6 illustrates a further modification including a CO detection and difference-forming means in which a supply of the combined exhaust gas is directed to the mixture control system.

FIG. 6 illustrates an engine with two cylinder groups in which one or more of the cylinders contains a fuel quantity which has been reduced by a constant percentagewise amount. The system also includes a supply of exhaust gas to the mixture control system.

Figure 7:
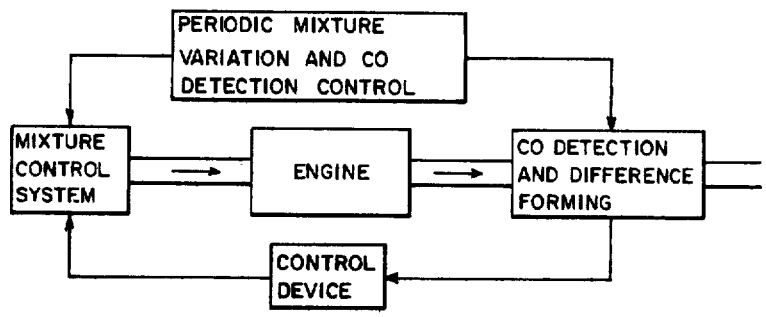
FIG. 7 illustrates a further modification which includes a periodic mixture variation and CO detection control means.

FIG. 7 illustrates an engine having two cylinder groups in which operating mixtures that deviate from one another by a constant percent value are periodically varied and the CO values of the exhaust gas which are in corresponding periodic sequence are detected by a single CO probe.

It is furthermore possible to perform the closed-loop conrol according to the invention in an engine having a conventional intake system and a conventional exhaust manifold system in such a way that the composition of the operational mixture being combusted is simultaneously modulated for all cylinders such that operational mixtures are periodically delivered to the cylinders one after another, the mixtures differing from one another by the constant amount $\Delta\Lambda$. The control intervention can be made either on the fuel side or on the air side, and on the air side it can be made indirectly by controlling the recirculated exhaust gas quantity. This type of closed-loop control is relatively expensive, however, except for the fact that it can be applied in the case of a conventional engine. Also, a very rapidly-functioning CO probe is necessary for this type of closed-loop control.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for closed-loop control of the average composition of operating mixtures periodically generated and combusted in an internal combustion engine, which comprises the steps of:

periodically generating, and combusting a first operating mixture and a second operating mixture in the internal combustion engine wherein the composition of the first operating mixture deviates from the composition of the second operating mixture in terms of the air number by a predetermined percentage;

detecting at least one CO exhaust gas measurement of a first CO value of exhaust gas resulting from the combustion of the first operating mixture and a second CO value of exhaust gas resulting from the combustion of the second operating mixture for determining carbon monoxide content of an exhaust gas;

determining, as an actual value, the difference between the first CO value and the second CO value;

comparing the determined actual value with a predetermined set-point value, and, upon deviation of the actual value from the set-point value, generating a corresponding corrective signal; and varying the compositions of the first and second operating mixtures in accordance with the corrective signal.

2. A method as defined by claim 1, wherein the operating mixture compositions deviate from one another in terms of the air number λ percentagewise by a constant amount and the set-point value is a constant value.

3. A method as defined by claim 2, wherein in order to generate operating mixtures deviating from one another by a percentagewise constant value, an operating mixture composition formed in all engine cylinders is periodically varied and the CO values of the exhaust gas which are in correspondingly periodic sequence are detected with a single CO probe.

4. A method as defined by claim 2, wherein the engine includes a plurality of cylinders and the step of generating operating mixture compositions deviating from one another comprises the steps of:

forming the first operating mixture composition to be combusted in at least one of the cylinders; and forming the second operating mixture composition, which deviates from said first operating mixture composition to be combusted in the remaining cylinders.

5. A method as defined by claim 4, wherein the step of periodically generating operating mixture compositions includes the step of periodically supplying identical quantities of fuel to all cylinders, and wherein the at least one of the cylinders of the engine is structurally so embodied that the fullness of the charge, with a fuel supply quantity which is identical for all cylinders, deviates from that of the remaining cylinders.

6. A method as defined by claim 4, wherein
the step of forming said second operating mixture composition includes supplying a first fuel quantity to each of said remaining cylinders; and
the step of forming said first operating mixture composition includes supplying a second fuel quantity, which has been reduced by a constant percentagewise amount from said first fuel quantity to each of said at least one cylinder.

7. A method as defined by claim 4, wherein at least one of the cylinders of the engine is supplied with an oxygen containing medium which is reduced by a constant percentagewise amount.

8. A method as defined by claim 7, wherein the percentagewise variation of the oxygen containing medium is attained by means of the supply of a quantity of recirculated exhaust gas.

9. A method as defined by claim 4, wherein the exhaust gas composition of the at least one cylinder is detected by means of a first CO probe and the exhaust gas composition of the remaining cylinders is detected with a second CO probe.

10. A method as defined by claim 4, wherein the exhaust gas composition of the at least one cylinder on the one hand as well as of the remaining cylinders on the other hand is detected at intervals with the aid of a single CO probe.

11. A method for closed-loop control of the average composition of an operating mixture to be combusted in an internal combustion engine with the aid of at least one CO exhaust gas measurement probe for detecting the carbon monoxide content of an exhaust gas produced by the engine, which comprises the steps of:

directing a protion of an exhaust gas from an exhaust of said engine to an air input to produce an exhaust gas-air mixture, periodically generating first and second operating mixtures the compositions of which deviate from one another in terms of air number λ;

detecting, with the at least one CO exhaust gas measurement probe, CO values of the exhaust gas which vary as a result of the deviations between said periodically generated first and second operating mixture compositions;

forming differences between the detected CO measurement values correspondent to said first and second operating mixture composition as actual values;

comparing said actual values with a set-point value;

generating, upon deviation of the particular actual value from the set-point value, a corresponding corrective signal; and varying the average operating mixture composition of the first and second operating mixture in accordance with said corrective signal.

12. An apparatus for an internal combustion engine comprising a first intake system supplying a first group of cylinders and a second intake system supplying a second group of cylinders, an adjustable first throttle device assigned to the first intake system and an adjustable second throttle device assigned to the second intake system for controlling air intake to each group of cylinders, means to adjust said first and second throttle devices simultaneously and as a result of the adjustment means the intake cross section at the first throttle device varies percentagewise by a larger value than the value of the intake cross section at the second throttle device, and an exhaust gas system connected with said first and second groups of cylinders, at least one CO probe disposed in the exhaust gas system and connected to a control device said control device comprising means by which different values of from said at least one CO probe corresponding to the resulting exhaust gas composition of said first and second group of cylinders periodically are sampled, means to form the difference between the sampled values corresponding to the exhaust gas composition of said first and second group of cylinders as an actual value, means to form a set point value and means to compare said actual value to said set point value and to generate a corresponding corrective signal, said control device varying correspondent to said corrective signal an operating mixture component which is not arbitrarily variable in an operating mixture of the engine.

13. An apparatus as defined by claim 12, wherein the intake systems communicate via at least one throttle device with a common exhaust recirculation line.

14. An apparatus as defined by claim 13, wherein the exhaust recirculation line communicates via a first partial line and a second partial line with the first intake system and the second intake system downstream of the first and second throttle device respectively.

15. An apparatus as defined by claim 13, wherein the throttle device in the exhaust recirculation line is embodied as a pressure regulation valve, wherewith as a result of the supply of exhaust gas, the pressure in the intake systems downstream of the first and second throttle devices can be established as constant.

16. An apparatus as defined by claim 14 which includes, a first exhaust manifold system assigned to the first group of cylinders and a second exhaust manifold system assigned to the second group of cylinders, a CO probe disposed in each of the exhaust manifold systems, the CO probes being connected via a device for forming the difference between the two probe output signals with a comparator device, the output value of the device for forming the difference is compared with a setpoint value and the output signal of the comparator device is delivered to a device for varying the proportion of one of the operating mixture components.

17. An apparatus as defined by claim 15, wherein throttle valves disposed in the intake system entrance cross sections are provided as the throttle devices and the pressure regulation valve has an adjusting diaphragm under the influence of a control spring, one side of which diaphragm is exposed to a constant reference pressure and the other side of which is exposed to the pressure in at least one of the intake systems downstream of the throttle devices.

* * * * *